Sept. 16, 1958     F. O. ROBBINS ET AL     2,852,277
MASKING ENVELOPE FOR SPACE RESERVATION TICKETS
Filed Aug. 14, 1953
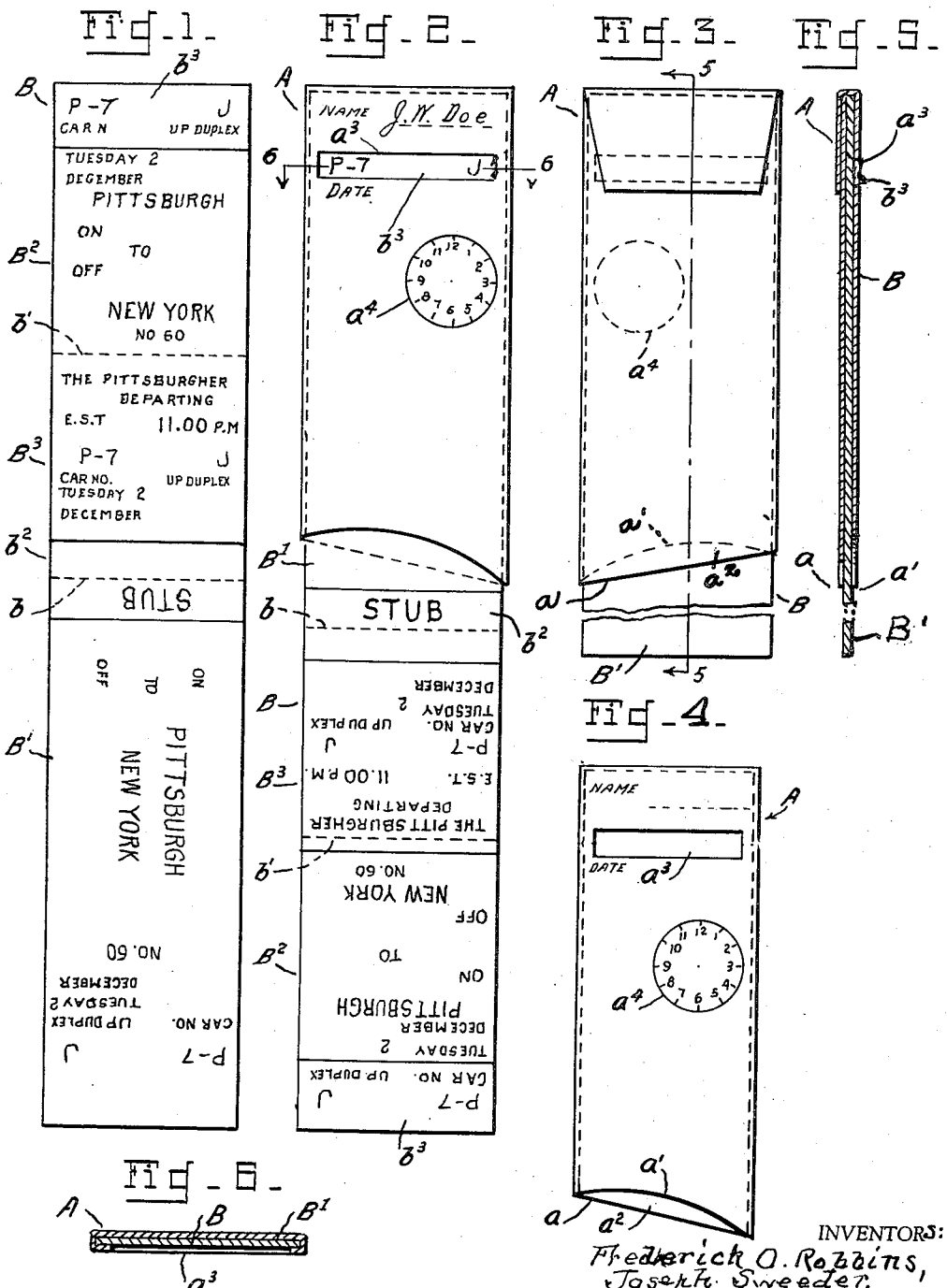
INVENTORS:
Frederick O. Robbins,
Joseph Sweeder,
Willis Dunbar,
Raymond W. Wolke,
By C. C. Hines,
ATTORNEY.

United States Patent Office 2,852,277
Patented Sept. 16, 1958

2,852,277

MASKING ENVELOPE FOR SPACE RESERVATION TICKETS

Frederick O. Robbins and Joseph Sweeder, Euclid, Willis Dunbar, Lakewood, and Raymond W. Wolke, Westlake, Ohio; said Robbins and said Sweeder assignors of twenty-five percent to The Pennsylvania Railroad Company, a corporation of Pennsylvania, and twenty-five percent to The New York Central Railroad, a corporation of New York Application August 14, 1953, Serial No. 374,294

3 Claims. (Cl. 283—23)

This invention relates to a hood envelope or window type of indicating envelope shield, for use in connection with space sales tickets or other like tickets, to cover a certain portion of the ticket and printed matter appearing thereon, while allowing other desired printed matter to be displayed through its window.

The envelope hood constituting this invention is particularly designed for use in connection with a space sales ticket of the type shown in this application and certain copending applications of Frederick O. Robbins, Joseph Sweeder, Willis Dunbar and Raymond W. Wolke, Ser. No. 374,254, filed Aug. 14, 1953, and Ser. No. 376,496, filed Aug. 25, 1953, and a copending application, Ser. No. 379,028, filed Sept. 8, 1953, by the said Raymond W. Wolke, in which distinguishingly colored preprinted ticket of this character stored for sale in a container and printed to designate different reserved spaces in a carrier vehicle, are arranged in groups in a certain order in the container to permit tickets applying to reserved spaces of different kinds or locations to be readily located and removed for dispensation. These tickets are sold to give purchasers of the transportation tickets the right of use of seats, berths and other reserved spaces between specified points of travel in vehicles or cars of a train departing at different time periods of a day, and for which charges are made in addition to the transportation charges. Such a ticket may be directly sold to a passenger by a ticket seller over a counter at a ticket office, or may be ordered by telephone or otherwise by a prospective passenger, with the understanding that the passengers will call for or "pick up" the ticket within a given time before the departure of the specified vehicle or train. In the latter case, the ticket, which may be termed a deferred sales ticket, is laid aside with other deferred tickets to be picked up. If, however, the person or passenger ordering a deferred ticket, does not pick it up within the allowed period, the ticket agent or seller withdraws it from the deferred sales file or stack and returns it to its normal position for sale to any other person desiring to purchase such a ticket. It is however, necessary when a deferred space reservation ticket is withheld from sale to distinguish it from other unsold tickets and place it where it will not be confused therewith in order to prevent its sale during the withholding period.

The object of the present invention is to provide means which may be readily applied to a deferred time limit reservation ticket whereby such a ticket may be distinguished from other tickets stored in a container therewith, and whereby the name of the patron may be placed on the ticket and sufficient of the printed matter on the ticket exposed to enable the ticket seller to quickly locate and withdraw the ticket for issuance to the patron who has ordered it when he calls for it, or for sale to another patron in case of default or cancellation of the order by the original patron.

A further object of the invention is to provide an envelope type of hood which is adapted to be easily and quickly applied to and removed from the ticket.

In the accompanying drawing illustrating the invention and its mode of use:

Fig. 1 is a face view of a reservation sales ticket of the character described and in conjunction with which the envelope may be used;

Fig. 2 is a similar view of the ticket showing the application of the envelope thereto;

Fig. 3 is a rear view of the envelope and the portion of the ticket to which it is applied;

Fig. 4 is a face view of the envelope per se;

Fig. 5 is a longitudinal section through the ticket and envelope taken on line 5—5 of Fig. 3; and Fig. 6 is a transverse section on line 6—6 of Fig. 2.

In carrying the invention into practice we provide a hood envelope A having a closed end, an open end, and a display window $a^3$, located adjacent to its closed end, and which is adapted to be applied to an end portion of a space sales reservation ticket B which may be of the type particularly shown in Figs. 1 and 2, or of any equivalent type.

The ticket B shown is one comprising an elongated strip of paper or other suitable material having a stub portion B′ at one end thereof and a coupon portion $B^2$, consisting of two coupon sections $B^{2\prime}$, $B^3$, at the opposite end thereof, said stub portion B′ being separable from the coupon portion $B^2$ along the weakened separating line $b$, and said coupon sections of the coupon portion being separable from each other along the weakened separating line $b'$. At the inner end or base of the portion B′, between the same and the weakened line $b$, is a portion $b^2$ in which appears the words "Stub," and at the inner end or base of the coupon portion $B^3$, between the same and the weakened line $b$, is a portion $b^2$ in which certain information relative to the use or value of the ticket B may be printed. Portions $b^2$, $b^{2\prime}$ form an intermediate information and connecting stub section arranged between and uniting the sections $B^1$, $B^2$ and separable from each other along the weakened line $b$ to detach the main stub and coupon sections $B^1$, $B^2$ from each other so that portions $b^{2\prime}$ and $b^2$ remain as stub ends of the respective sections $B^1$, $B^2$, and so as to make each section $B^1$, $B^2$ of greater length than the envelope, for a purpose hereinafter described.

The portions or sections B′, $B^2$, $B^3$ of the ticket are printed to show the type of space, unit of space, car number, train number time of departure, destination, issuing railroad, and the day, date and month of departure of the train for which the ticket is issued. All of the tickets B bear the same date and of different colors applying to the different reservations spaces of a vehicle or cars of trains departing on that date, are stacked in groups, according to the vehicles or trains to which they apply, in sequence with respect to departure times, or otherwise to suit conditions, and the groups are separated from each other by dividers bearing signs or matter descriptive of the vehicles or trains to which they apply. The printed matter shown on the ticket sections in the present instance includes the car code number, P–7 and code letter J indicating that the reserved space is a certain duplex, which, with regard to stub section $B^1$ and coupon section $B^2$, appear in the outer or free end portions $b^3$ of said sections.

Each ticket container is or may be an open-topped channeled container in which the tickets are stacked with their stub portions $B^1$ fitted in the container channel and their coupon portions $B^2$ projecting upwardly therefrom or vice versa. When a ticket is sold and dispensed over the counter at the ticket office the coupon portion thereof is separated along the line $b$ from the stub portion B′ and handed to the patron for its intended purposes, while the stub portion is placed at a selected placed in the container for use as an office record of the transaction. When, however, a space reservation is ordered by telephone or otherwise, the ticket for which is to be called for or "picked up" by the passenger, this ticket is withdrawn from its normal position and a hood envelope A of the character described is fitted upon its free end portion B' as shown in Fig. 2. The ticket so masked or hooded is then replaced in the container either in its original position or in a selected position with other masked tickets but with its coupon section disposed for arrangement in the container and its stub section portion $b^{2'}$ projecting upwardly above the top of the container. The envelope A applied to each ticket in this manner indicates that the ticket to which it is applied is a ticket which has been ordered but not paid for and is to be held for the person ordering it for a certain period, during which it will not be sold to another.

The envelope A which is made of paper stock preferably of a determined distinguishing color, comprises an oblong, rectangular envelope body of a length, width, and breadth substantially conforming to the ticket portion to which it is to be applied and is closed at its sides and outer end and open at its inner end to adapt it to be readily slipped on and off the ticket. At its open end the envelope has the end edge $a$ of its rear wall inclined at a diagonal angle on a straight line and has the end edge $a'$ of its front wall cut away on a curved line so as to leave the adjacent end portion of the rearwall exposed and projecting in the form of a guide lip or ledge $a^2$. This construction of the entrance end of the envelope facilitates and renders easy the entrance of the ticket thereinto and slipping of the ticket thereon without the necessity of spreading the open end of the ticket in the usual way. The front wall of the envelope is provided with a window $a^3$ in the form of an opening located adjacent its closed end to expose the data on party B' of the ticket giving the code number of the car and the code letter of the reservation space to which the ticket applies. Above this window appears a space in which the passenger's name is written and below the window is a space to receive the date on which the reservation expires and a clock dial presentation $a^4$ on which by a suitably drawn line the ticket seller may indicate the time of day the order expires, i. e., the time limit allowed the passenger to pick up the ticket. If at the end of this time limit the passenger has not picked up the ticket, or has by notice cancelled the reservation, the envelope is removed from the ticket and the ticket returned to its normal position in the ticket group or stack pile for sale to another applicant.

It will be observed that each ticket section $B^1$, $B^2$ is a counterpart of the other, with the exception of the coupon construction of section $B^2$, including its stub part $b^2$ or $b^{2'}$, as the case may be, is of greater length than the envelope, so that either section may be masked by the envelope with the same result of disposing an end portion $b^3$ in contact with the closed end of the envelope and registration with the window and disposing an opposite end portion $b^2$ or $b^{2'}$ to project beyond the open end of the envelope. Thus it makes no substantial difference which section of the ticket a newly employed, inexperienced, careless or nervous ticket seller may mask in a hurry of the moment at a busy time, as the same general result will be obtained, it merely being necessary for the seller to see that the front of the ticket faces the front wall of the envelope, which is readily determinable at a glance owing to the presence of the printed matter and stub indications $b^2$, $b^{2'}$ on the face of the ticket. Thus errors which might otherwise occur through improper masking will be prevented or largely reduced. Assuming, for example, that section $B^1$ is the one masked, it will be understood that this section and the envelope masking it will project above the top of the container, while section $B^2$ will be fitted in the container, with the stub portion $b^{2'}$ projecting just above the top of the container, so that said section $B^2$ will serve as a support for the projecting masked section and the masking envelope. After a sale is made the envelope and ticket are withdrawn from the container, the coupon section $B^2$ is detached from the section $B^1$ and handed to the patron, and section $B^1$ is left in the envelope and returned therewith to the container for collection with other dispensed tickets at accounting time. When replaced in the container for this purpose the envelope with the enclosed stub section will be disposed so that its stub portion $b^2$ will be lowermost and rest on the bottom of the container, and the disposal of the envelope in this position will indicate that a sale of the ticket has been made. On the other hand, if section $B^2$ of the ticket should be the one masked, in which event section $B^1$ will fit in the container and serve as the support for the masked ticket, then, when a sale is made, the envelope with the ticket fitted therein will be removed from the container, section $B^2$ will be detached from section $B^1$ and turned over to the patron, while the envelope, with the section $B^1$ remaining in it, will be returned in upright position to the container, so that its stub portion will rest on the bottom of the container and its indicia $b^3$ will show through the window and indicate the sale of a particularly designated ticket and indicate in conjunction with its portion $b$ the character of the ticket section masked by the envelope, the envelope and masked ticket section being then placed on the container with other tickets in a group for collection at accounting time. Thus either section of the ticket may be masked for reservation purposes without any difference in final result for recording and accounting purposes if the ticket is picked up. If, however, the ticket is not picked up by a patron for whom it has been reserved within a set time limit before the departure of the train, the ticket is removed from the envelope at the sales station and turned over to the train conductor for sale, while the envelope is left in the container at the sales station. If then the conductor makes a sale he detaches coupon $B^2$ from coupon $B^3$ and turns coupon $B^3$ over to the patron and retains coupon $B^2$ for recording and accounting purposes, or, if he fails to make a sale, he returns the ticket intact to the accounting bureau of the issuer. By this construction of the parts and method of operation, elements for all recording and accounting purposes are provided which require little or no written entries to be made and which avoid the use of an issuer's ticket or coupon or conductor's chart requiring a multiplicity of recording actions to be made in their use.

Inasmuch as large numbers of classified groups of tickets pre-printed for use on a given day or days are stacked in containers mounted for reciprocating movements toward and from sales stations located at different points along a counter or table in their path of travel, it is desirable to employ relatively long and narrow envelopes and tickets to adapt them to be fitted in and project from the containers so as to be easily observed and handled by the ticket sellers, as well as to allow a large number of stocked containers to be used in a given space and to also reduce the weight of the containers and tickets to permit the loaded containers to be easily shifted back and forth between selling stations. It is also desirable that the tickets fit snugly in the envelope and be practically of the same width as the envelopes to prevent relative shifting movements between a masked ticket and its envelope, due to shocks, jars and other disturbing movements of the reciprocated containers, and causing the identifying data on the ticket portions $b^3$ getting out of registration with the windows $a^3$. Because of this close fit of the tickets in the envelopes it is further desirable to provide an envelope of a suitable construction at its inlet end to permit of the use of tickets which through practically as wide as the envelope may be readily fitted in the envelope. Such close fit of the ticket in the envelope makes it comparatively difficult and time consuming to insert the end of a ticket into the mouth or entrance opening of an envelope body having the end edges of its front and rear walls extending straight across the walls at right angles to the plane of the body, which requires the spreading of the envelope walls in the region of the opening with the result of transversely contracting the envelope and making it difficult to insert the ticket. This difficulty is overcome by our construction of extending the end edges across the walls at a diagonal angle to the plane of the envelope body which widens the entrance opening along hte diagonal line and allows easy insertion of the ticket, particularly at an angle to the plane of the envelope body. The use of a projecting guide ledge, when an envelope of the particular construction shown is employed, also provides a means for supporting and guiding the end of a ticket toward the entrance opening and automatically spreading the envelope walls as the ticket enters the opening.

While our ticket and envelope constructions have been expressly designed for use in connection with railway and other like transport vehicle reservation tickets, it is evident that their use is not restricted thereto, as the invention may be applied to tickets and envelopes for the reservation of seats or other reservation spaces of various kinds in exhibition buildings, parks, stadiums and like exhibition structures.

The conventional diagram in use today is actually a floor plan of the sleeping car, coach, parlor car, etc. This diagram may be a plan of a car having various reserved space units. The tickets A used as described are individual tickets printed for each one of these units represented on the diagram.

There are several systems of filing the conventional diagram in a diagram room which point is contacted by telephone by both the public to make reservations and the ticket sellers to make and/or sell reservations. Some systems include a method of storing the same car of a train for a given number of days, which might be 30, 60 or 90, together on one board which is termed a diagram block. Each additional car on a train is stored on a similar block and, as an example, for a train which normally carries 8 pullman cars there would be filed reservations or sales on 8 separate blocks—each of these 8 cars for a given period as explained above.

In making a reservation, it is necessary for the operator to remove the block, search thru the diagrams on the block until the correct date is located and then scan the diagram for space which might be open and available, to make the reservation. In the use of the pre-printed space ticket, all of a like type of space, regardless of car, would be grouped together as long as the assignment was on the same train and for the same date. If a train, as is usually the case, carries more than one type of space, each type, and as before mentioned on different colored paper, would be also grouped together. As an example of this, a train which had 8 cars and mixed thru these 8 cars four different types of space, all of the space tickets A for the train on any one date would be grouped together and would present a pack of space tickets of different colors for different spaces. In handling of a servation where this latter system is in effect, an operator would merely look at the pack of tickets and from the color indication could determine if the desired space was available. This would eliminate a concentration of many units of space, usually of more than one type, in one packet as on a diagram board for many days.

There are many disadvantages to the diagram board for filing, such as when one operator is using a particular board no other operator can use the same board until the first operator has completed her work with it. In making reservations on the diagram the operator writes the passenger's name in the space if it is available. In the use of our pre-printed tickets the operator would write the passenger's name on a small envelope which is placed over the end of the space ticket and would show, in addition to the passenger's name, the time limit by hour and date the length of time the reservation would be held. Thru a small cut-out window in the envelope the space and car number would show. This space ticket, with the envelope on the end, would be kept with the particular train and would be placed to the rear of the entire pack, and the color being of buff would indicate that this space was not for sale except to the person for whom it was reserved. If the patron did not purchase the ticket within the prescribed time limit it would only be necessary to remove the envelope and place the ticket back with the other tickets for sale. In the case of a reservation on the conventional diagram, the entire block must be scanned for the cancellation of time limits and the name erased from the space where it had been written to provide for a sale.

A further advantage in this connection is that when any activity is necessary in connection with space reserved, either as a passenger calling to cancel reserved space, checking to see what the time limit is, or ticket sellers calling to make a sale as the passenger presents himself at the ticket office, the operator must scan the entire block of diagrams on which there could be vacant space and ticket numbers as well as name reservations. With the pre-printed card tickets the operator need scan only those which are actually reserved.

At the time of sale on a conventional diagram either where it consists of reserved space or unreserved space, the ticket number is manually scribed on the diagram by the operator. In the use of pre-printed tickets the ticket is removed for a sale, separated at the center perforation, the top half delivered to the patron and the lower half marked "Stub" returned to the file for an office record. Here again points out the simplified procedure—an operator has a call for sale by a ticket seller of unreserved space she must scan the diagram block throughout to locate vacant space and this again would include looking thru name reservations and ticket numbers whereas with the pre-printed tickets she need scan only the tickets which are actually open for unreserved sale because the reserved tickets would be covered by the manila envelopes and the ones already sold would be one-half as long as the tickets still for sale. This again provides the possibility for more than one operator to be handling transactions pertaining not only to a given train on a given date but any number of operators would be performing the same function all at the same time, whereas with the space accumulated on a diagram block it is possible for only one operator to function at one time.

Many errors are committed by ticket sellers and operators in a reservation bureau thru misunderstanding of dates, numbers and letters spoken over a telephone and these are eliminated by the use of pre-printed tickets. This also eliminates a joint responsibility by the two employees as, with all of the information pre-printed on the ticket, it would be the responsibility of the ticket seller to furnish the passenger with a ticket with the correct date, train and space. It would be impossible to sell the same unit of space twice as is very often the case thru negligence on the part of employees, as each ticket would be printed in advance and only one ticket would be printed for each unit of space.

These space tickets will have no monetary value and in the sale, a special revenue ticket must be attached to make them valid for the accommodations.

As a result of this simplified procedure the annoyance, inconvenience and in the aggregate delay to patrons, which under the conventional system is very great, would be materially reduced because of the method in handling and as a result of the elimination of delays where several operators are attempting to make use of the diagram block when it is at the same time being used by other operators, time consumed would be reduced and the resulting saving in labor cost would be effective.

The use of the hood envelope with a space reservation ticket of the character described, and the described mode of handling orders for reservations in advance, and which are picked up or not or cancelled on notice, saves a great deal of time and labor over the conventional method of using diagrams and diagram boards or blocks having spaces for recording reservations made and sold or cancelled.

Having thus described our invention, we claim:

1. In combination, a ticket comprising an elongated rectangular sheet bearing on one face indicia located at a definite location relative to the edges of said sheet, and bearing other indicia at other locations, a masking envelope for accommodating an end portion of said sheet, said envelope comprising front and rear walls having their side edges and end edges at one end secured together and serving as guides and abutments for corresponding edges of said sheet, the width of said envelope being just sufficient to allow entry of said ticket in said envelope, the other end of said envelope being open, said envelope having in its front wall an opening located at the position of said first-mentioned indicia of said rectangular sheet and exposing said first-mentioned indicia to view while said other indicia is masked when said ticket is fully inserted in said envelope, said open end of said envelope being disposed at an acute angle to one side edge thereof whereby the length of the opening is longer than the width of said envelope and entrance of the ticket into the envelope is facilitated when the ticket is initially inserted from an angle to the central axis of the envelope approximately normal to the open edge, and is prevented when attempt is made to insert the ticket from a corresponding angle to the central axis on the opposite side of said axis of the envelope so that the handler is able to sense by feel whether the opening in the envelope will be adjacent the face of the sheet bearing the indicia to be exposed through said opening.

2. In combination, a ticket comprising an elongated rectangular sheet bearing on one face indicia located at a definite location relative to the edges of said sheet, and bearing other indicia at other locations, a masking envelope for accommodating an end portion of said sheet, said envelope comprising front and rear walls having their side edges and end edges at one end secured together and serving as guides and abutments for corresponding edges of said sheet, the width of said envelope being just sufficient to allow entry of said ticket in said envelope, the other end of said envelope being open, said envelope having in its front wall an opening located at the position of said first-mentioned indicia of said rectangular sheet and exposing said first-mentioned indicia to view while said other indicia is masked when said ticket is fully inserted in said envelope, one side of said open end of said envelope being located longitudinally in advance of the other corresponding side thereof whereby the distance between the opposite ends of the opening is longer than the width of said envelope and entrance of the ticket into the envelope is facilitated when the ticket is initially inserted from an angle to the central axis of the envelope and is prevented when attempt is made to insert the ticket from a corresponding angle to the central axis on the opposite side of said axis of the envelope so that the handler is able to sense by feel whether the opening in the envelope will be adjacent the face of the sheet bearing the indicia to be exposed through said opening.

3. The combination according to claim 2, and in which the edge of one wall of said envelope at said opening is concavely shaped to facilitate spreading said walls apart when a ticket is to be inserted therein.

References Cited in the file of this patent

UNITED STATES PATENTS

| | | |
|---|---|---|
| 37,264 | Morgan | Dec. 23, 1862 |
| 1,198,200 | Deutschmeister | Sept. 12, 1916 |
| 1,219,175 | Sewell | Mar. 13, 1917 |
| 1,400,652 | Anderson | Dec. 20, 1921 |

FOREIGN PATENTS

| | | |
|---|---|---|
| 364,079 | France | May 21, 1906 |